C. E. Phillips.
Rolling Pin.
N° 47,979. Patented May 30, 1865.
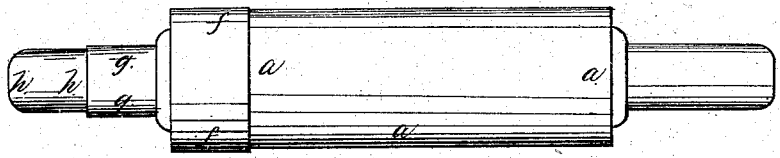
Fig. 1
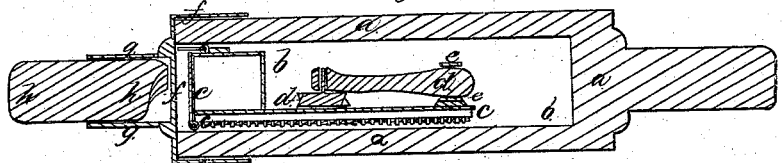
Fig. 2
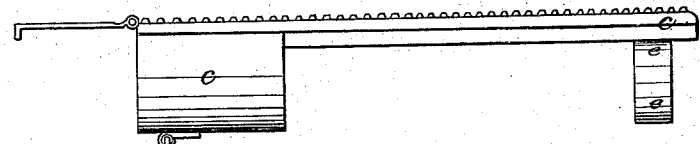
Fig. 3
Fig. 4 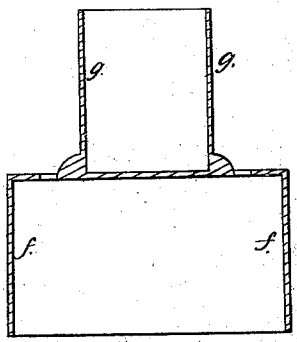 Fig. 5  Fig. 6 
Fig. 7 Fig. 8
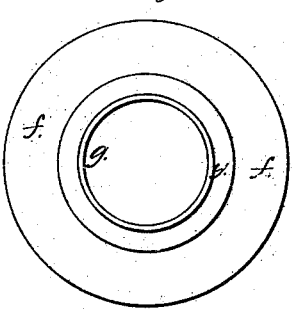
Witnesses:
Saml. M. Bartow
George W. Mann
Inventor:
C. E. Phillips
by his Atty
Joseph Gavett

UNITED STATES PATENT OFFICE.

C. E. PHILLIPS, OF ABINGTON, MASSACHUSETTS.

IMPROVED ROLLING-PIN.

Specification forming part of Letters Patent No. 47,979, dated May 30, 1865.

*To all whom it may concern:*

Be it known that I, CHARLES E. PHILLIPS, of Abington, in the county of Plymouth and State of Massachusetts, have invented certain new and useful Improvements in Rolling-Pins; and I do hereby declare that the following description, taken in connection with the accompanying plate of drawings, hereinafter referred to, forms a full and exact specification of the same, wherein I have set forth the nature and principles of my said improvements by which my invention may be distinguished from all others of a similar class, together with such parts as I claim and desire to have secured to me by Letters Patent.

The present invention relates to a rolling-pin so constructed as to contain within itself the various utensils used in the preparing of pastry, cake, &c., thus economizing space and saving of the time usually spent in collecting the separate articles when scattered about in different directions, as they are often apt to be for want of a proper receptacle to contain them.

I will now proceed to describe in detail my improvements, together with the manner in which the above-mentioned results are obtained.

The accompanying plate of drawings represent my improvements.

Figure 1 is an elevation of my improved combination rolling-pin. Fig. 2 is a central vertical longitudinal section of the same. Fig. 3 is a side view of a nutmeg-grater, enlarged. Fig. 4 is an enlarged detail view of a toothed roller or pastry cutter. Fig. 5 is an end and Fig. 6 is a side view of a pastry-smoother, &c., enlarged. Fig. 7 is an enlarged detail central vertical section of a biscuit and cake cutter, and Fig. 8 is a top view of the same.

*a a a* in the drawings represent a rolling-pin made with a receptacle or aperture, *b b*, within it, suitable for receiving a nutmeg-grater, *c c*, and a toothed roller or pastry-cutter, *d d*. On the top of the grater *c c*, at one end, a ring or band, *e e*, is formed for the purpose of holding the handle of the toothed rooler *d d*, which is used for cutting and ornamenting pastry, &c. One end, *f f*, of the roller *a a* is made of tin or other metal, and so formed as to fit over the roller *a a* and to serve, when detached from it, as a ring to cut out biscuits, &c. To this removable end *f f* is attached a handle, *g g*, also of tin or other metal, so formed as to receive and hold a wooden handle, *h h*. The tin or other metal handle *g g* is used for cutting holes in cakes, &c.; and the wooden one is formed at one end in the shape shown in Figs. 5 and 6, and is used, when removed from the tin handle *g g*, for the purpose of smoothing and escaloping the pastry, and when attached to the tin handle *g g* forms with it the handle to the roller *a a*.

From the above description it will be seen that a rolling-pin is constructed which not only answers all the purposes of those heretofore in use, but is supplied with the requisite means of containing, in a compact form, the other various implements used in the making of pastry, cake, &c.

Having thus described my improvements, I shall state my claims as follows:

What I claim as my invention, and desire to have secured to me by Letters Patent, is—

1. Forming a rolling-pin at one end or through its whole extent hollow, or with a suitable aperture or receptacle for receiving such implements as are generally used in the manipulation and ornamentation of pastry, &c.

2. Combining with the rolling-pin a removable handle which will also serve as a cutter, as described.

3. The combination and arrangement of the removable handle and cutter *f f* with the pastry-smoother *h h*.

4. The combination of the rolling-pin *a a a*, nutmeg-grater *c c*, and biscuit-cutter *f f*, as described.

CHAS. E. PHILLIPS.

Witnesses:
JARED WHITMAN,
EPHM. WHITMAN.